(12) United States Patent
Zimmer et al.

(10) Patent No.: US 7,321,990 B2
(45) Date of Patent: Jan. 22, 2008

(54) SYSTEM SOFTWARE TO SELF-MIGRATE FROM A FAULTY MEMORY LOCATION TO A SAFE MEMORY LOCATION

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 10/748,502

(22) Filed: Dec. 30, 2003

(65) Prior Publication Data

US 2005/0188278 A1  Aug. 25, 2005

(51) Int. Cl.
*G06F 11/00* (2006.01)

(52) U.S. Cl. .............. 714/42; 714/5; 714/7; 714/8; 714/48

(58) Field of Classification Search ........... 714/42, 714/5, 53, 8, 48, 36, 7
See application file for complete search history.

(56) References Cited

U.S. PATENT DOCUMENTS

| | | | |
|---|---|---|---|
| 5,592,616 A * | 1/1997 | Finch et al. ............. 714/42 |
| 5,638,532 A | 6/1997 | Frame et al. |
| 5,862,314 A * | 1/1999 | Jeddeloh ............... 714/8 |
| 6,189,111 B1 * | 2/2001 | Alexander et al. ........ 714/8 |
| 6,240,531 B1 * | 5/2001 | Spilo et al. ............. 714/38 |
| 6,343,338 B1 | 1/2002 | Reneris |
| 2002/0010876 A1 * | 1/2002 | Kliegelhofer et al. ...... 714/5 |
| 2002/0169951 A1 | 11/2002 | Zimmer |
| 2002/0169979 A1 | 11/2002 | Zimmer |
| 2003/0093579 A1 | 5/2003 | Zimmer et al. |
| 2003/0140271 A1 * | 7/2003 | Wynn et al. ............. 714/8 |
| 2003/0154392 A1 * | 8/2003 | Lewis ................... 713/200 |
| 2003/0177129 A1 * | 9/2003 | Bond et al. ............. 707/100 |

OTHER PUBLICATIONS http://en.wikipedia.org/wiki/Extensible-Firmware-Interface.*

* cited by examiner

*Primary Examiner*—Yolanda L. Wilson
(74) *Attorney, Agent, or Firm*—Blakely, Sokoloff, Taylor & Zafman LLP

(57) ABSTRACT

A method and system to provide system software to self-migrate from a faulty memory location to a safe memory location. A faulty portion of memory in a system software memory region of a computer system is detected, the faulty portion having stored a system software component. The system software component is relocated from the faulty portion of memory to a safe portion of memory.

21 Claims, 7 Drawing Sheets

SYSTEM SOFTWARE TO SELF-MIGRATE FROM A FAULTY MEMORY LOCATION TO A SAFE MEMORY LOCATION

BACKGROUND

1. Field of Invention

The field of invention relates generally to computer systems and, more specifically but not exclusively, relates to system software to self-migrate from a faulty memory location to a safe memory location.

2. Background Information

In a typical PC architecture, the initialization and configuration of the computer system by the Basic Input/Output System (BIOS) is commonly referred to as the pre-boot phase. The pre-boot phase is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware acts as an interface between software and hardware components of a computer system. As computer systems have become more sophisticated, the operational environment between the application and OS levels and the hardware level is generally referred to as the firmware or the firmware environment.

When a computer system starts up, system software is loaded into memory. Usually, system software is loaded once when the computer is booted and is not removed from memory until the system is shut down. In contrast, user applications are designed and implemented so that they may be loaded and torn down numerous times during a single on/off cycle of the computer system. Thus, if the memory location of a user application is faulty, a simple solution is to re-start the application in a different memory location. However, system software generally cannot be moved to a different memory location without resetting the entire computer system.

Today's system software does not have the ability to self-relocate without restarting the computer system. The system software may be able to mark a region of memory as "bad" and keep the information in persistent storage (e.g., flash, CMOS, etc.) so that the next time the system starts, these faulty memory areas will be avoided when loading the system software. However, for systems that rarely reboot, such as a server, errors may grow within a region of memory until finally a complete failure occurs. Also, while scrubbing the failed memory area may reduce some memory errors, repeatedly scrubbing a faulty region wastes resources and creates overhead that reduces system performance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a method and system to provide system software to self-migrate from a faulty memory location to a safe memory location are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention: Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment of the present invention, firmware of a computer system operates in accordance with an extensible firmware framework known as the Extensible Firmware Interface (EFI) (EFI Specification, Version 1.10, Dec. 1, 2002, available at http://developer.intel.com/technology/efi.) EFI is a public industry specification that describes an abstract programmatic interface between platform firmware and shrink-wrap operating systems or other custom application environments. The EFI framework standard includes provisions for extending BIOS functionality beyond that provided by the BIOS code stored in a platform's BIOS device (e.g., flash memory.) More particularly, EFI enables firmware, in the form of firmware modules and drivers, to be loaded from a variety of different resources, including primary and secondary flash devices, option ROMs (Read-Only Memory), various persistent storage devices (e.g., hard disks, CD-ROM (Compact Disk-Read Only Memory), etc.), and from one or more computer systems over a computer network.

Figure 1A:
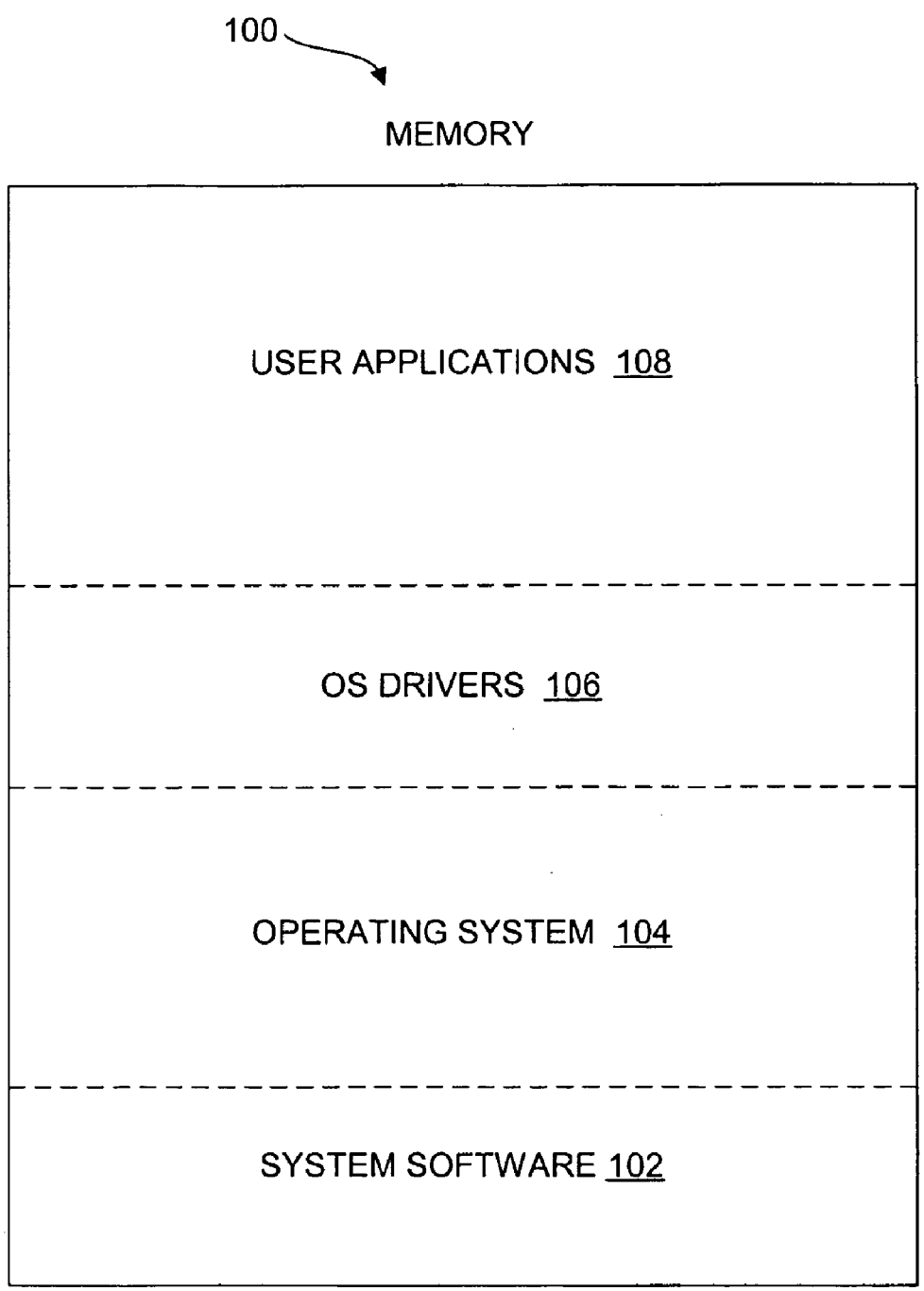
FIG. 1A is a block diagram illustrating one embodiment of a memory of a computer system in accordance with the teachings of the present invention.

FIG. 1A illustrates a memory 100 at OS runtime of a computer system according to an embodiment of the present invention. Memory 100 has stored system software 102, an operating system 104, OS drivers 106, and user applications 108. System software 102 may include, but is not limited to, EFI components, such as EFI Runtime Drivers, Portable Executable and Common Object File Format (PE/COFF) images, System Management Mode (SMM) components, or the like.

Generally, system software includes instructions and data loaded during the pre-boot phase that persist into operating system runtime. The system software is not under the control of the operating system. In one embodiment, the system software is loaded from a firmware device during pre-boot. The operating system may not even be aware of system software that is loaded into memory. In one embodiment, during pre-boot, the firmware allocates a system software memory region for its own use and tags this portion of memory as reserved and thus not useable by the operating system.

It will be understood that embodiments of the invention are not limited to the memory layout as shown in FIG. 1A. Also, for simplicity, each section of memory, such as operating system 104, is shown as contiguous, but it will be understood that each space may include non-contiguous portions of memory 100.

Figure 1B:
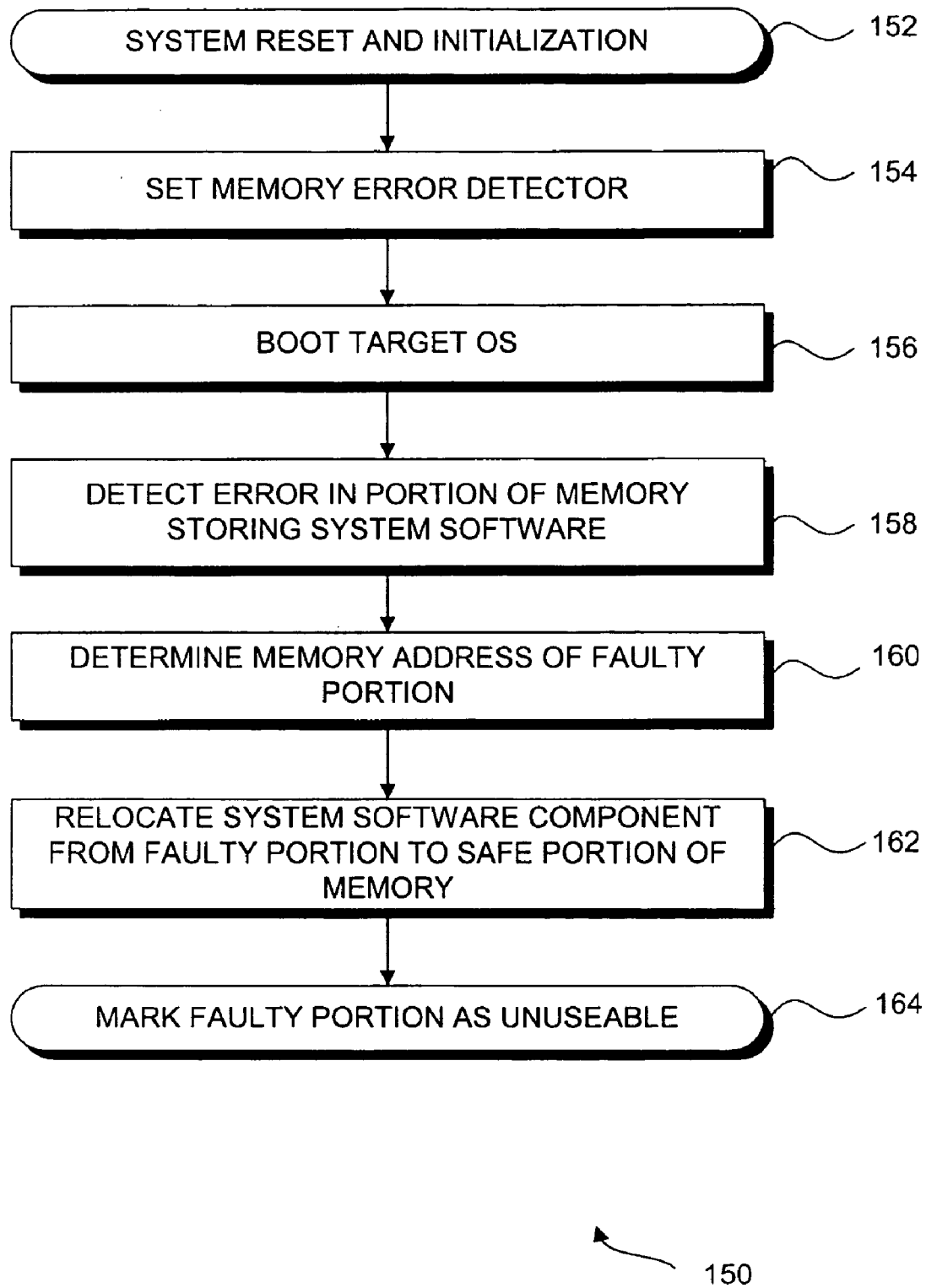
FIG. 1B is a flowchart illustrating one embodiment of the logic and operations for system software to self-migrate from a faulty memory location to a safe memory location in accordance with the teachings of the present invention.

FIG. 1B shows a flowchart 150 that illustrates an embodiment of the invention to migrate system software from a faulty memory location to a safe memory location. Beginning in a block 152, the computer system is reset and initialized. Boot instructions stored in the computer system firmware are loaded into memory and executed. In one embodiment, the system boot instructions will begin initializing the platform by conducting a Power-On Self-Test (POST) routine. During the pre-boot phase, hardware devices such as a processor, the chipset, and memory of the computer system are initialized. Also, during initialization some system software may be loaded into memory.

Continuing in a block 154, a memory error detector is set. In one embodiment, the memory error detector includes an error correction code (ECC.) ECC generally refers to various methods to detect errors in transmitted or stored data and, in some cases, to correct them. Proceeding to a block 156, the target OS of the system is booted. In a block 158, during OS runtime, an error is detected in a portion of memory storing system software. The memory address of the faulty portion is determined, as depicted at a block 160. The logic continues to a block 162 where the system software is relocated from the faulty portion to a safe portion of memory. In a block 164, the error portion is marked as unusable. The former location of the system software may be logged to a System Error Log (SEL) or Baseboard Management Controller (BMC) for later analysis.

Figure 1C:
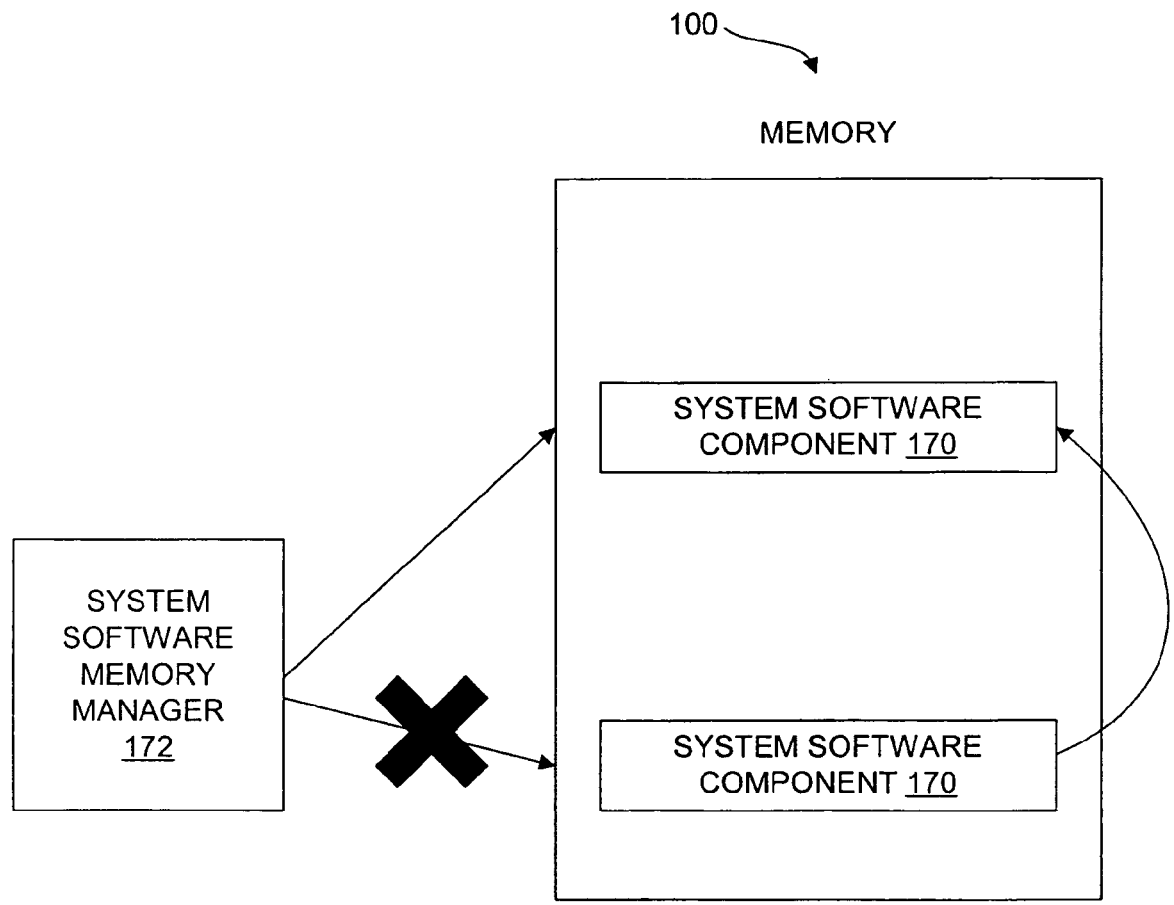
FIG. 1C is a block diagram illustrating one embodiment of system software to self-migrate from a faulty memory location to a safe memory location in accordance with the teachings of the present invention.

FIG. 1C is a block diagram illustrating one embodiment of relocating a system software component 170 in accordance with the teachings of the present invention. System software component 170 is a portion of the system software 102 loaded in memory 100. In one embodiment, such a system software component includes a Portable Executable and Common Object File Format (PE/COFF) executable image. A system software manager 172 is used to track the location of system software components in memory. As shown in FIG. 1C, system software memory manager 172 is updated to indicate the new location of system software component 170 when component 170 is relocated from a faulty memory location to a safe memory location of memory 100.

Migrating away from faulty memory regions increases system reliability and reduces performance overhead. It is important to migrate away from memory areas that generate Single-Bit Errors (SBEs) because too many SBEs may lead to a Multi-Bit Error (MBE.) Generally, an SBE includes a single bit of data being incorrect when reading an entire byte (or word.) An MBE includes more than one bit in a complete byte being incorrect. Usually, an MBE is not correctable, so the data or code that was stored in that region of memory is lost. Also, numerous SBEs create performance overhead because of the need for constant scrubbing and logging of errors.

It will be appreciated that embodiments of the present invention allow for system software to perform self-healing actions independent of the operating system. Instructions and data in memory under control of firmware may be allocated and migrated without the firmware consulting the operating system. Moreover, this migration of system software is done dynamically to prevent system down-time that would be caused if the system had to be re-booted after a system software migration. The system software itself detects errors and performs the relocation of a system software component.

Figure 2:
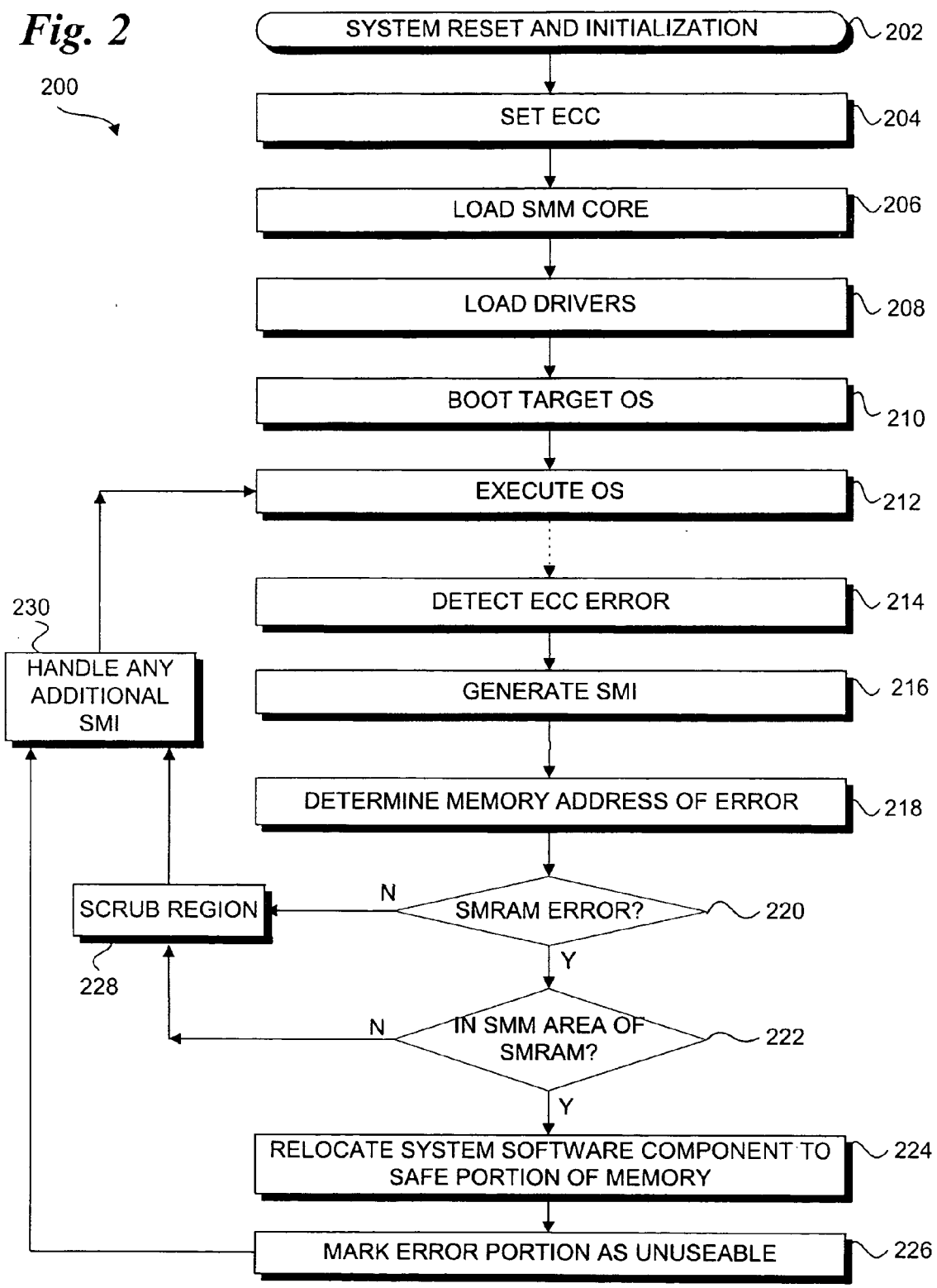
FIG. 2 is a flowchart illustrating one embodiment of the logic and operations for system software to self-migrate from a faulty memory location to a safe memory location in accordance with the teachings of the present invention

FIG. 2 shows a flowchart 200 that illustrates an embodiment of the invention to provide system software to migrate from a faulty memory location to a safe memory location utilizing the System Management Mode (SMM) of an Intel Architecture 32-bit processor (IA32 processor.)

SMM is a special mode for handling system wide functions and is intended for use only be system firmware, and not by an OS or an application. When SMM is invoked through a System Management Interrupt (SMI), the processor saves the current state of the processor and switches to a separate operating environment contained in System Management Random Access Memory (SMRAM). While in SMM, the processor executes SMI handler code to perform operations. When the SMI handler has completed its operations, it executes a resume instruction. This instruction causes the processor to reload the saved state of the processor, switch back to protected or real mode, and resume executing the interrupted application or OS tasks.

Starting in a block 202, the computer system is reset and initialized. Proceeding to a block 204, the error correction code is set. Continuing in a block 206, the SMM core is loaded. Proceeding to a block 208, drivers are loaded. Such drivers include, but are not limited to, a SMM driver. SMI Handlers may also be loaded into SMRAM during pre-boot. In an EFI-compliant system, boot service and runtime service drivers are loaded into conventional memory (i.e., memory outside of SMRAM.) The boot service drivers are unloaded when the target OS is booted, while the runtime drivers continue into OS runtime.

The logic proceeds to a block 210 where the target OS is booted. In a block 212, the OS executes. As the OS executes, the ECC monitors the memory for errors. When an ECC error is detected, as depicted in a block 214, an SMI is generated, as shown in a block 216. The SMI interrupts OS runtime and puts the computer system into SMM. In one embodiment, the error is a single bit error in memory.

Proceeding to block 218, the memory address of the error is determined. In a decision block 220, the logic determines if the memory error is in the portion of memory containing SMRAM. If the answer to decision block 220 is no, then the logic proceeds to a block 228 to scrub the memory region with the SBE.

Memory scrubbing is often used to correct memory errors, and involves reading memory and writing back to it. Generally, this duty is automatically handled via a system's chipset (e.g., memory controller) and/or built-in functionality provided by a memory component (e.g., a Dynamic Random Access Memory (DRAM) Dual In-line Memory Module (DIMM)). However, in some instances in which the memory controller or built-in functionality is less sophisticated, this task must be performed by software through a service handler.

If the answer to a decision block 220 is yes, then the logic proceeds to a block 222 to determine if the address of the error is within an SMM area of SMRAM. In one embodiment, the SMM core keeps a system software memory manager having pointers to SMM components within SMRAM. Each pointer is checked to determine if its associated SMM component is at an address having the error. If the error is not within an SMM component, then the error is in an unused portion of SMRAM and the answer to decision block 222 is no. In one embodiment, the SMM core may manage a queue of pointers to SMM Drivers and a queue of pointers to SMI Handlers.

If the answer to decision block 222 is no, then the logic proceeds to block 228 to scrub the region. After the region is scrubbed, the logic proceeds to block 230 to handle any additional SMIs and then to block 212 to resume executing the OS.

If the answer to decision block 222 is yes, then the logic proceeds to a block 224 to relocate the system software to a safe location of memory. Embodiments of relocating the system software are described below. Proceeding to a block 226, the error portion of memory is marked as unusable. Marking the error portion as unusable ensures that the system does not accidentally migrate into the error portion at a later time. The logic then proceeds to block 230 to handle any other SMIs, and then back to block 212 to continue executing the OS.

Figure 3:
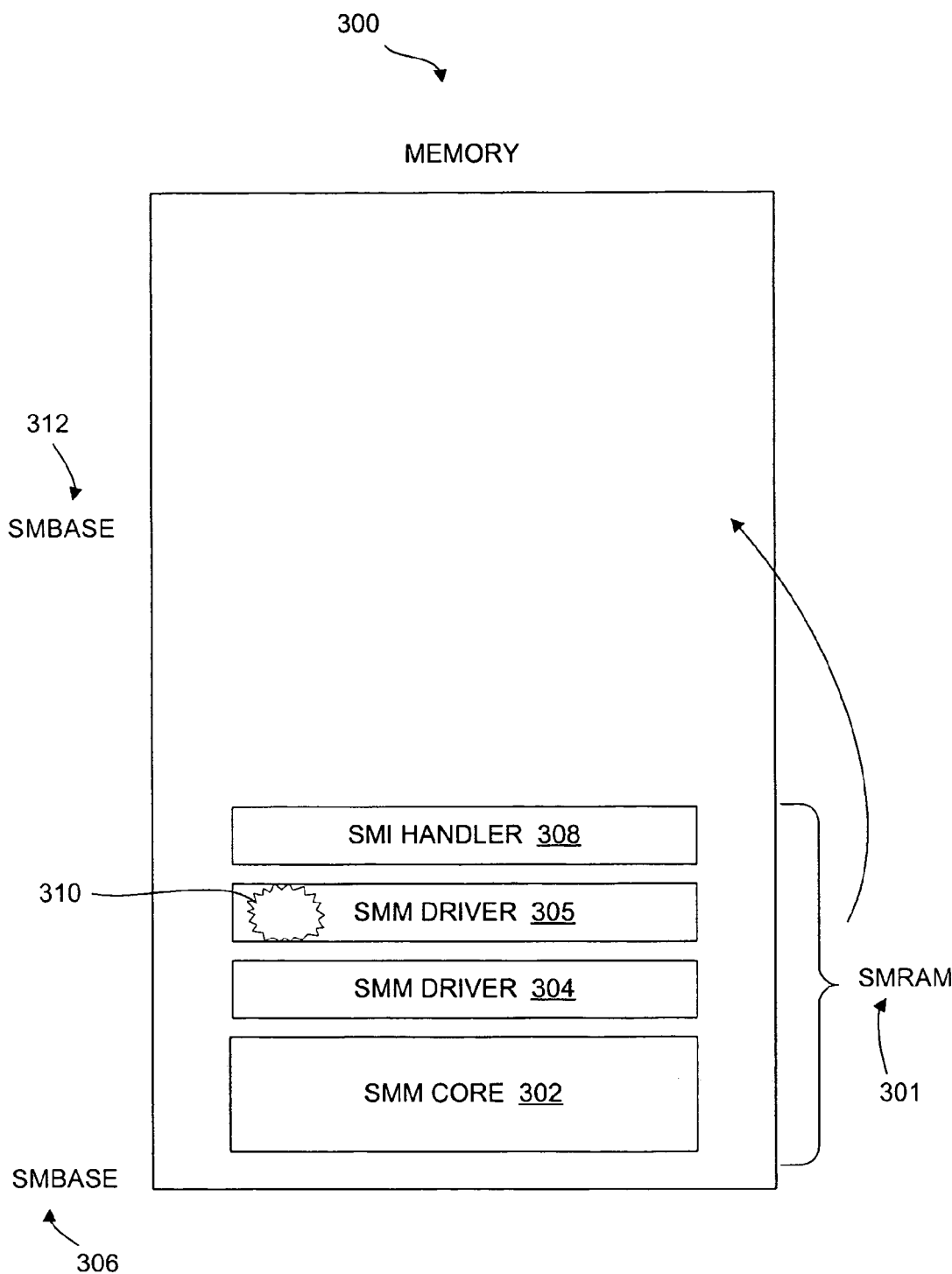
FIG. 3 is a block diagram illustrating one embodiment of system software to self-migrate from a faulty memory location to a safe memory location in accordance with the teachings of the present invention.

FIG. 3 illustrates an embodiment of the invention to migrate system software from a faulty memory location to a safe memory location in an IA32 computer system employing legacy system software. Memory 300 of a computer system includes SMRAM 301. SMRAM 301 includes an SMM core 302, SMM Drivers 304-305, and SMI Handler 308. The SMM core 302 includes pointers to the SMM Drivers 304-305. Each SMM Driver 304-305 includes code for processing an SMI to a hardware device of the computer system during SMM.

While in SMM, the processor executes code and stores data in the SMRAM space. The actual physical location of the SMRAM may be in system memory or in a separate memory device. The SMRAM space is mapped to the physical address space of the processor that can be up to 4 Gigabytes (GB) in size. SMRAM may be allocated various portions of memory including, but not limited to, 512 Kilobytes (KB), 1 Megabyte (MB), 8 MBs, or the like. The processor uses SMRAM to save the state of the processor and to store SMM related code and data. SMRAM may also store system management information and Original Equipment Manufacturer (OEM) specific information.

SMRAM begins at a base physical address called SMBASE as shown at 306 in FIG. 3. Usually, the default base address of SMBASE is 30000H. SMI requests use the SMBASE as a starting point to process an SMI.

A Global Descriptor Table (GDT) describes system segments such as SMM. A Code Segment Descriptor (CSD) is associated with each system segment of the GDT. Usually, a CSD is 8 bytes long and includes the segment's base address, size, and other information. An offset is added to the segment base address to produce a 32-bit linear address. If paging is disabled, then the linear address is interpreted as a physical address. If paging is enabled, then the linear address is interpreted as a virtual address and mapped to a physical address using page tables.

In legacy SMM, SMM code is linked at address 0 of memory and the CSD base is set to map the address 0 to the base of SMRAM. In one embodiment, relocating the system software may include moving the contents of SMRAM to another portion of memory and resetting the SMBASE. In FIG. 3, SMRAM 301 is moved to another portion of memory. The SMBASE 306 is then reset to new location SMBASE 312 to establish a new base for SMRAM. The GDT and CSDs are updated accordingly.

Figure 4:
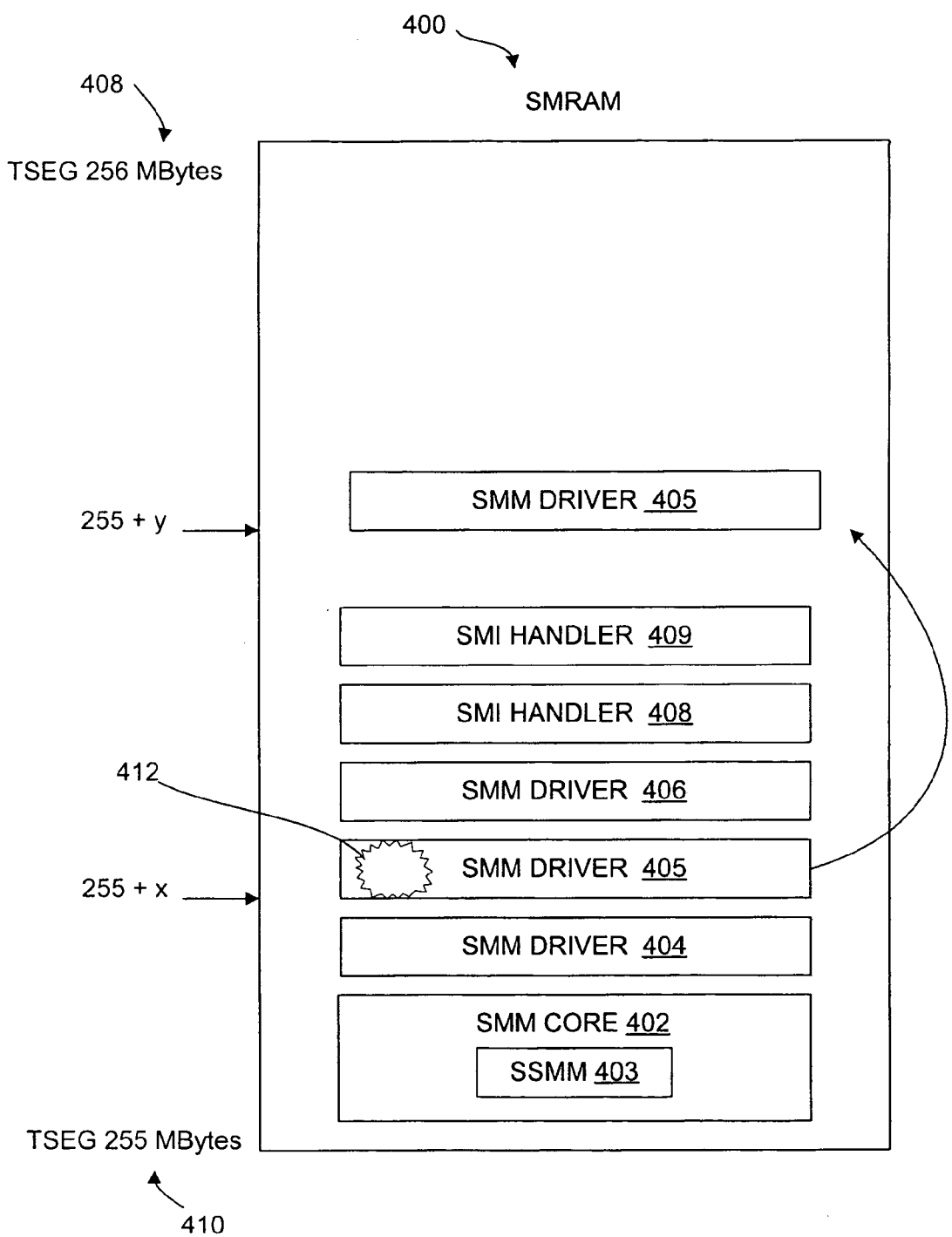
FIG. 4 is a block diagram illustrating one embodiment of system software to self-migrate from a faulty memory location to a safe memory location in accordance with the teachings of the present invention.

FIG. 4 illustrates an embodiment of the invention to migrate system software from a faulty memory location to a safe memory location in an IA32 computer system having system software compliant with the EFI framework. In one embodiment, the memory is executed in a physical addressing mode.

The SMBASE for EFI compliant systems is established during pre-boot as follows. The SMBASE is a register in each CPU. CPU starts with the SMBASE set to 0x38000H (0x3000-segment, offset 0x8000.) The permissible address ranges for the platform's SMRAM implementation is ascertained and allocated. After the address range has been allocated, the initial address for the SMRAM is relocated from the default address (0x38000H) to the ascertained platform address. This region of SMRAM is protected by the chipset. In one embodiment, the SMRAM is relocated to a position below 4 Gigabytes of physical memory.

In one embodiment, relocating the system software may include moving at least a portion of SMRAM within the SMRAM address space. SMRAM 400 includes software components of an SMM core 402, SMM Drivers 404-406, and SMI Handlers 408-409. In FIG. 4, SMM Driver 405 is at address Top of Segment (TSEG) 255 MB+x. An error 412 is detected in SMM Driver 405, so SMM Driver 405 is migrated within SMRAM 400 to position TSEG 255 MB+y.

In one embodiment, the SMM Core maintains a system software memory manager (SSMM) 403 to map available SMRAM space and to map locations of system software components. The system software uses the system software memory manager 403 to find an available memory region for migration of the SMM Driver 405. The pointer to SMM Driver 405 in the SMM Core 402 is updated with the new location of SMM Driver 405. The old location of SMM Driver 405 is marked as unusable.

In another embodiment, the entire SMRAM 400 is relocated to another location in memory, similar to as described above in conjunction with FIG. 3. The new locations of the system software components are updated in the system software memory manager 403.

In one implementation of EFI, Portable Executable and Common Object File Format (PE/COFF) executable images are used (PE/COFF Specification, Version 6.0, February 1999, available at http://www.microsoft.com/whdc/hwdev/hardware/pecoff.mspx) for various system software components. The PE/COFF images can be relocated to the new, safer memory location without having to manage the GDT and/or paging as described above connection with FIG. 3. In the embodiment of FIG. 4, SMM Core 402, SMM Drivers 404-406, and SMI Handlers 408-409 are PE/COFF executable images.

Embodiments of the present invention may be implemented on a 64-bit processor, such as the Intel® Itanium® family of processors. Itanium® processors employ a Platform Management Interrupt (PMI.) The handling of an SMI with an IA32 processor and a PMI with an Itanium® family processor involve similar processes. In general, the operations and logic as shown in the flowcharts of FIG. 1B and FIG. 2 may be applied in analogous manner to an Itanium® processor.

Itanium® firmware includes a System Abstraction Layer (SAL), Processor Abstraction Layer (PAL), and an EFI Layer. The SAL is a firmware layer that isolates operating system and other higher-level software from implementation differences in the platform. The PAL provides a firmware abstraction between the processor hardware and system software and platform firmware, so as to maintain a single software interface for multiple implementations of the processor hardware.

PAL-based interrupts are serviced by PAL firmware, system firmware, or the operating system. One type of interrupt is a Platform Management Interrupt (PMI.) A PMI is a platform management request to perform functions such as platform error handling, memory scrubbing, or power management.

PMIs occur during instruction processing causing the flow of control to be passed to the PAL PMI Handler. In the process, system state information is saved in the interrupt registers by the processor hardware and the processor starts to execute instructions from the PAL. The PAL will either handle the PMI if it is a PAL-related PMI or transition to the SAL PMI code if the PMI is a SAL related PMI. Upon completion of the processing, the interrupted processor state is restored and the execution of the interrupted instruction is resumed.

Some differences between Itanium® and IA32 processors are noted as follows. First, Itanium® processors do not enter a special CPU mode upon activation of a PMI signal. Instead, Itanium® processors provide a mechanism to bring a handler into the processor to handle a PMI event. Second, instead of maintaining an SMRAM area, Itanium® processors use a Firmware Reserved region in memory for storing system software. Firmware Reserved memory includes a portion of memory that holds firmware components similar to those discussed above with reference to the SMRAM used for IA32 processors. The system software stored in the Firmware Reserved area is maintained in OS runtime memory and does not have hardware protection as with SMRAM. In an EFI-compliant system, an EFI Runtime memory region may be reserved for use by EFI components.

Relocating system software in a computer system having an Itanium® processor is similar to that as described above in conjunction with FIG. 4. When an error is detected in a region of memory having a system software component, that system software component may be relocated to an available portion of memory. Pointers to the component are updated appropriately and the former location is marked as unusable. In one embodiment, since the system software is located in OS runtime memory space, the OS may also be made aware that the former location of the system software component is unusable memory space.

Generally, components within control of the computer system firmware may be relocated as described herein. Components that are within SMRAM, Firmware Reserved memory, or the like, may be relocated. In embodiments of an EFI-compliant system, EFI runtime drivers, as well as other EFI components that survive into OS runtime, may also be relocated as described herein.

Figure 5:
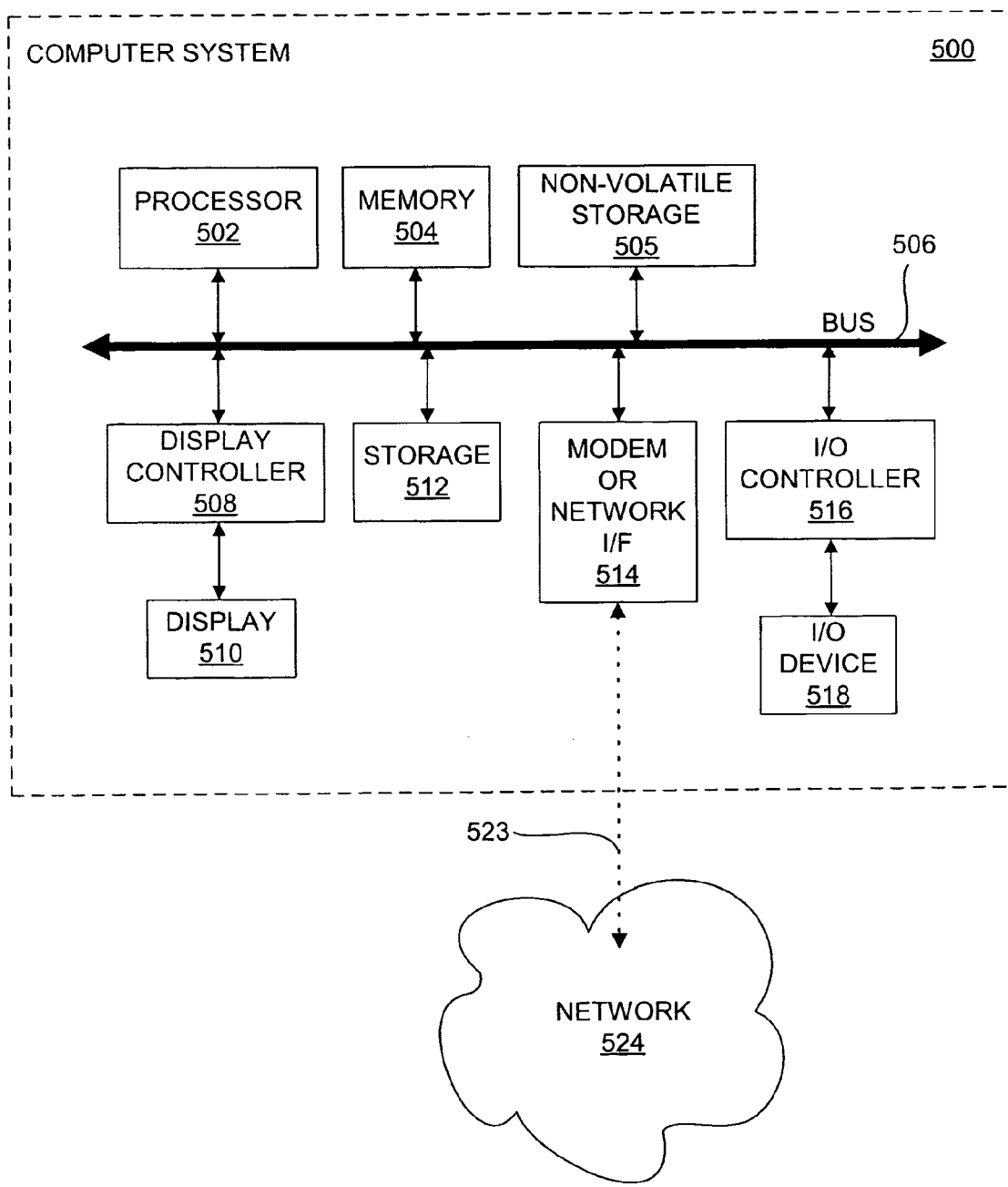
FIG. 5 is a block diagram illustrating one embodiment of a computer system in accordance with the teachings of the present invention.

FIG. 5 is an illustration of one embodiment of an example computer system 500 on which embodiments of the present invention may be implemented. Computer system 500 includes a processor 502 coupled to a bus 506. Memory 504, storage 512, non-volatile storage 505, display controller 508, input/output controller 516 and modem or network interface 514 are also coupled to bus 506. The computer system 500 interfaces to external systems through the modem or network interface 514. This interface 514 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 523 is received/transmitted by modem or network interface 514 to communicate with computer system 500. In the embodiment illustrated in FIG. 5, carrier waive signal 523 is used to interface computer system 500 with a computer network 524, such as a local area network (LAN), wide area network (WAN), or the Internet. In one embodiment, computer network 524 is further coupled to a remote computer (not shown), such that computer system 500 and the remote computer can communicate.

Processor 502 may be a conventional microprocessor including, but not limited to, an Intel Corporation x86, Pentium®, or Itanium® family microprocessor, a Motorola family microprocessor, or the like. Memory 504 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 508 controls in a conventional manner a display 510, which in one embodiment may be a cathode ray tube (CRT), a liquid crystal display (LCD), an active matrix display, or the like. An input/output device 518 coupled to input/output controller 516 may be a keyboard, disk drive, printer, scanner and other input and output devices, including a mouse, trackball, trackpad, joystick, or other pointing device.

The computer system 500 also includes non-volatile storage 505 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 512 in one embodiment may be a magnetic hard disk, an optical disk, or another form of storage for large amounts of data. Some data may be written by a direct memory access process into memory 504 during execution of software in computer system 500. It is appreciated that software may reside in storage 512, memory 504, non-volatile storage 505 or may be transmitted or received via modem or network interface 514.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.). In addition, a machine-readable medium can include propagated signals such as electrical, optical, acoustical or other form of propagated signals (e.g., carrier waves, infrared signals, digital signals, etc.).

It will be appreciated that computer system 500 is one example of many possible computer systems that have different architectures. For example, computer systems that utilize the Microsoft Windows® operating system in combination with Intel microprocessors often have multiple buses, one of which may be considered a peripheral bus. Workstation computers may also be considered as computer systems that may be used with the present invention. Workstation computers may not include a hard disk or other mass storage, and the executable programs are loaded from a corded or wireless network connection into memory 504 for execution by processor 502. In addition, handheld or palmtop computers, which are sometimes referred to as personal digital assistants (PDAs), may also be considered as computer systems that may be used with the present invention. As with workstation computers, handheld computers may not include a hard disk or other mass storage, and the executable programs are loaded from a corded or wireless network connection into memory 504 for execution by processor 502. A typical computer system will usually include at least a processor 502, memory 504, and a bus 506 coupling memory 504 to processor 502.

It will also be appreciated that in one embodiment, computer system 500 is controlled by operating system software. For example, one embodiment of the present invention utilizes Microsoft Windows® as the operating system for computer system 500. In other embodiments, other operating systems that may also be used with computer system 500 include, but are not limited to, the Apple Macintosh operating system, the Linux operating system, the Microsoft Windows CE® operating system, the Unix operating system, the 3Com Palm operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
   detecting a faulty portion of memory in a computer system during an operating system (OS) runtime, the faulty portion having stored a system software component in a system software memory region of memory, the system software component being a portion of a system software loaded in memory and including instructions loaded a firmware device during a pre-boot phase of the computer system that persist into the OS runtime of the computer system; and
   relocating the system software component from the faulty portion of memory to a safe portion of memory, wherein the system software that includes the system software component independently performs the detecting of the faulty portion of memory and the relocating of the system software component.

2. The method of claim 1 wherein relocating the system software component comprises:
   finding the safe portion of memory within the system software memory region;
   moving the system software component to the safe portion of memory; and
   updating a system software memory manager to indicate the system software component is located at the safe portion of memory.

3. The method of claim 1 wherein relocating the system software component comprises:
   finding the safe portion of memory within the memory of the computer system;
   moving the system software memory region to the safe portion of memory; and
   resetting a base address for the system software memory region.

4. The method of claim 1 wherein the system software memory region comprises System Management Random Access Memory (SMRAM).

5. The method of claim wherein the system software memory region comprises a firmware reserved region of memory of the computer system.

6. The method of claim 1, further comprising setting a memory error detector during a pre-boot phase of the computer system.

7. The method of claim 1, further comprising determining a memory address of the faulty portion.

8. The method of claim 1, further comprising marking the faulty portion as unusable.

9. An article of manufacture comprising:
   a tangible machine-readable storage medium including a plurality of instructions which when executed perform operations comprising:
   detecting a faulty portion in a system software memory region of a computer system during an operating system runtime of the computer system, the system software memory region having stored system software for the computer system, the system software including instructions loaded from a firmware device during a pre-boot phase of the computer system that persist into the operating system runtime of the computer system; and
   relocating the system software from the faulty portion to a safe portion of memory of the computer system during operating system runtime, wherein the system software independently performs the detecting of the faulty portion of memory and the relocating of the system software component.

10. The article of manufacture of claim 9 wherein relocating the system software comprises:
    finding the safe portion of memory;
    moving a portion of system software to the safe portion of memory; and
    indicating the portion of system software is located at the safe portion of memory.

11. An article of manufacture of claim 10 wherein indicating the portion of system software is located at the safe portion of memory comprises updating a system software memory manager for the system software memory region to indicate the portion of system software is at the safe portion of memory.

12. The article of manufacture of claim 10 wherein the portion of system software comprises an executable image in accordance with a Portable Executable and Common Object File Format (PE/COFF).

13. The article of manufacture of claim 9 wherein the system software memory region comprises a System Management Random Access Memory (SMRAM) region.

14. The article of manufacture of claim 9 wherein the system software memory region comprises a firmware reserved region, wherein firmware of the computer system to operate in accordance with an Extensible Firmware Interface (EFI) framework standard.

15. The article of manufacture of claim 9 wherein execution of the plurality of instructions further perform operations comprising marking the faulty portion of the system software memory region as unusable after relocating the system software.

16. A computer system, comprising:
a processor;
a memory device operatively coupled to the processor; and
at least one flash device operatively coupled to the processor, the at least one flash device including firmware instructions which when executed by the processor perform operations comprising:
    detecting a faulty portion of the memory device during an operating system runtime of the computer system, the faulty pardon of the memory device having stored a system software component for the computer system, the system software component being a portion of a system software loaded in the memory device and including instructions loaded from a firmware device during a pre-boot phase of the computer system that persist into the OS runtime of the computer system;
    determining a location of the faulty portion; and
    relocating the system software component from the faulty portion to a safe portion of the memory device during operating system runtime, wherein the system software including the system software component independently performs the detecting, determining and relocating.

17. The computer system of claim 16 wherein relocating the system software component comprises:
    finding the safe portion of the memory device;
    moving the system software component to the safe portion; and
    updating a system software memory manager to indicate that the system software component is located at the safe portion.

18. The computer system of claim 16 wherein the system software component includes an executable image in accordance with a Portable Executable and Common Object File Format (PE/COFF).

19. The computer system of claim 16 wherein the system software component is stored in a System Management Random Access Memory (SMRAM) region of the memory device.

20. The computer system of claim 16 wherein the system software component is stored in a firmware reserved region of the memory device.

21. The computer system of claim 16 wherein the firmware instructions to operate in accordance with an Extensible Firmware Interface (EFI) framework standard.

* * * * *